United States Patent Office 3,059,101

Patented Oct. 16, 1962

1

3,059,101
WELDING ELECTRODE

Edward R. Gamberg, Clarence, N.Y., and George H. Cotter, Monroeville, Pa., assignors to Westinghouse Electric Corporation, East Pittsburgh, Pa., a corporation of Pennsylvania No Drawing. Filed Mar. 17, 1959, Ser. No. 799,852
9 Claims. (Cl. 219—145)

This invention relates to the arc-welding art and has particular relationship to consumable arc-welding electrodes of the continuous type, used primarily for semi-automatic and automatic welding, as distinct from electrodes of the rod type, used for manual welding.

In welding with such continuous consumable electrodes, it is desirable to use a shielding gas, such as carbon dioxide, which is of relatively low cost. The selling price of carbon dioxide is one cent per cubic foot, while other gases suitable for shielding purposes, such as the inert gases argon and helium, have a relatively higher cost of the order of ten cents per cubic foot. The rate at which the shielding gas is supplied may be 40 cubic feet per hour so that shielding gas is an important factor in the cost of a weld.

It is then broadly an object of this invention to provide a continuous consumable electrode particularly suitable for welding with carbon dioxide.

In welding mild steel in accordance with the teachings of the prior art with a consumable electrode suitable for automatic or semiautomatic welding in a shield of carbon dioxide, it has been found that the weld bead produced is relatively narrow and has a high penetration, that is it penetrates deeply into the work being welded. Attempts to lay down a wider bead by impressing a higher-than-normal arc voltage between the electrode and the work have proven unsuccessful. It has been found that the higher arc voltage adversely affects the physical properties of the deposited weld metal. Attempts have been made in accordance with the teachings of the prior art to remedy this deficiency by adding materials to the arc which compensate for the effect of the higher arc voltage. Such materials have been introduced into the shielding gas or have been carried by the electrode itself, for example, as a center core in the electrode, or have been introduced as part of the composition of the electrode. But, such electrodes permitting the impressing of a higher arc voltage are excessively costly, and they do not entirely eliminate the difficulty.

It is then a specific object of this invention to eliminate the difficulties encountered in the attempts described above to weld with carbon dioxide in accordance with the teachings of the prior art and particularly to eliminate these difficulties in the welding of mild steel.

A more specific object of this invention is to provide an arc welding electrode of relatively low cost for welding continuously in the use of which a wide bead of sound composition shall be deposited.

This invention arises from the discovery that satisfactory results both as to the width of bead, the soundness of the weld and cost are achieved with an electrode having certain materials deposited on its surface. In the practice of this invention, the core of the electrode which may be a wire is given a micro-roughening by sand or shot blasting. Arc-widening material is then embedded in the surface in such a manner that it fills the valleys of the surface but leaves the peaks of the surface bare so that the welding current can be readily conducted through the peaks. The material may be referred to as arc-widening material and in arriving at this invention has been found to include a number of different materials.

In accordance with the specific aspects of this invention, it has been found that highly satisfactory results are

2 achieved with powdered aluminum embedded in the surface of the core wire of mild steel. Other materials which have proven satisfactory as arc-widening materials, both alone and in combination, are as follows:

(1) Potassium permanganate
(2) Potassium titanate
(3) Potassium silicate
(4) Potassium carbonate
(5) Sodium carbonate
(6) Barium oxide
(7) Strontium oxide
(8) Calcium oxide
(9) Titanium dioxide
(10) Aluminum phosphate
(11) Borax (sodium tetraborate)
(12) CMC (Dow Chemical's Carboxymethocel)
(13) Ferro manganese
(14) Ferro silicon
(15) Powdered iron The electrode, according to this invention, may be produced in the manner disclosed in Patent 2,883,306, granted April 21, 1959, to George H. Cotter for "Electrode Coating Process and Apparatus." The arc-widening material is derived from a slip and is embedded in the core in the manner taught by the above-identified Cotter application. A slip which has proved highly satisfactory has the following composition:

| | Parts by weight |
|---|---|
| Titanium dioxide (pigment grade) | 800 |
| Aluminum powder | 40 |
| Potassium permanganate | 200 |
| Magnesium carbonate | 100 |
| Aluminum phosphate | 100 |
| Sodium carbonate | 100 |
| Sodium silicate | 40 |
| Water | 1950 |

An important feature of this electrode which distinguishes it from other electrodes of the prior art is that the coating of arc-widening material is very thin. In the case of the electrode with aluminum as an arc-widening material, it has been found that the ratio of the weight of the arc-widening material to the weight of the electrode coated is about one part in ten thousand.

While the electrode as disclosed above is advantageous for all types of mild steel, it has proved particularly suitable for mild steel having the following composition:

| | |
|---|---|
| Carbon | .09% to .15%. |
| Manganese | .80% to 1.10%. |
| Silicon | .35% to .50%. |
| Sulfur | Not more than .035%. |
| Phosphorus | Not more than .03%. |
| Iron | Remainder. |

It has been found that an electrode consisting of a core wire of the above-defined composition with its surface roughened and with a material such as powdered aluminum or one or more of the materials listed above or the composition listed above embedded in the surface produces a highly satisfactory bead in welding with carbon dioxide.

The electrode in accordance with this invention has the advantage over analogous prior art electrodes of better wash and less spatter over certain current-voltage ranges. The electrode is particularly good for horizontal single pass fillets, where good wash, bead contour and decreased penetration is achieved. This electrode used at 320 to 360 amperes and at 32 to 34 volts across the arc readily gives a resulting horizontal fillet of 5/16 of an inch, while the largest horizontal fillet that can be made with analogous prior art electrodes is a 1/4 inch fillet, and good bead contour is difficult to achieve with prior art electrodes. It is found using the electrode according to this invention that a forehand technique gives the best bead contour and "wash"—this is especially true where the plate is scaley or rusty. The good wash characteristics and the spread of the arc plasma is not noticeable above 360 amperes. This electrode is preferably used at reverse polarity. But, it has been found that when the electrode is used at straight polarity, it has certain advantages as far as penetration, bead width and deposition are concerned.

When welding at reverse polarity with this electrode there is a 15% reduction in spatter loss as compared to spatter loss for prior art electrodes. This is shown by tests made with beads produced with the electrodes on flat plate. Much higher reductions should be achieved on horizontal fillets.

While preferred embodiments of this invention have been disclosed above, many modifications thereof are feasible. This invention, then, is not to be restricted except insofar as is necessitated by the spirit of the prior art.

We claim as our invention:

1. An arc-welding consumable electrode particularly for continuous welding of steel in a shield of carbon dioxide comprising a core of steel having a roughened surface and having a thin but effective layer of an arc-widening material embedded in the valleys of said surface, the peaks of said surface being left uncovered so as to conduct electrical current readily, said layer comprising a powder or a slip or the like and being effective to produce a substantial arc-widening effect.

2. An arc-welding consumable electrode particulary for continuous welding of steel in a shield of carbon dioxide comprising a core of steel having a roughened surface and having a thin but effective layer of an arc-widening material embedded in the valleys of said surface, the peaks of said surface being left uncovered so as to conduct electrical current readily, the ratio of the weight of said material to the weight of the core wire in which said material is embedded being about one ten-thousandth.

3. An arc-welding consumable electrode particularly for continuous welding of steel in a shield of carbon dioxide comprising a core of carbon steel having a roughened surface and having a thin but effective layer of an arc-widening material embedded in the valleys of said surface, the peaks of said surface being left uncovered so as to conduct electrical current readily, said arc-widening material consisting essentially of powdered aluminum and said layer being effective to produce a substantial arc-widening effect.

4. An arc-welding consumable electrode particularly for continuous welding of steel in a shield of carbon dioxide comprising a core of steel having a roughened surface and having a thin but effective layer of an arc-widening material embedded in the valleys of said surface, the peaks of said surface being left uncovered so as to conduct electrical current readily, said arc-widening material comprising a powder of one or more of the class consisting of:

| | |
|---|---|
| (1) Aluminum powder | (10) Titanium dioxide |
| (2) Potassium permanganate | (11) Aluminum phosphate |
| (3) Potassium titanate | (12) Borax (sodium tetraborate) |
| (4) Potassium silicate | |
| (5) Potassium carbonate | (13) CMC (Dow Chemical's Carboxymethocel) |
| (6) Sodium carbonate | |
| (7) Barium oxide | (14) Ferro manganese |
| (8) Strontium oxide | (15) Ferrosilicon |
| (9) Calcium oxide | (16) Powdered iron |

and said layer being effective to produce a substantial arc-widening effect.

5. An arc-welding consumable electrode particularly for continuous welding of steel in a shield of carbon dioxide comprising a core of carbon steel having a roughened surface and having a thin but effective layer of an arc-widening material embedded in the valleys of said surface, the peaks of said surface being left uncovered so as to conduct electrical current readily, said arc-widening material being embedded in said core from a slip having essentially the following composition:

| | Parts by weight |
|---|---|
| Titanium dioxide (pigment grade) | 800 |
| Aluminum powder | 40 |
| Potassium permanganate | 200 |
| Magnesium carbonate | 100 |
| Aluminum phosphate | 100 |
| Sodium carbonate | 100 |
| Sodium silicate | 40 |
| Water | 1950 |

6. An arc-welding consumable electrode particularly for continuous welding of steel in a shield of carbon dioxide comprising a core of carbon steel having essentially the following composition:

| | |
|---|---|
| Carbon | .09% to .15%. |
| Manganese | .80% to 1.10%. |
| Silicon | .35% to .50%. |
| Sulfur | No more than .035%. |
| Phosphorous | No more than .03%. |
| Iron | Remainder. |

and said layer being effective to produce a substantial arc-widening effect and having a roughened surface and having a thin but effective layer of an arc-widening material embedded in the valleys of said surface, the peaks of said surface being left uncovered so as to conduct electrical current readily said material comprising a powder of one or more of the class consisting of:

| | |
|---|---|
| (1) Aluminum powder | (10) Titanium dioxide |
| (2) Potassium permanganate | (11) Aluminum phosphate |
| (3) Potassium titanate | (12) Borax (sodium tetraborate |
| (4) Potassium silicate | |
| (5) Potassium carbonate | (13) CMC (Dow Chemicals Carboxymethocel) |
| (6) Sodium carbonate | |
| (7) Barium oxide | (14) Ferro manganese |
| (8) Strontium oxide | (15) Ferro silicon |
| (9) Calcium oxide | (16) Powdered iron |

7. An arc welding consumable electrode particularly for continuous welding of steel in a s hield of carbon dioxide comprising a core of carbon steel having essentially the following composition:

| | |
|---|---|
| Carbon | .09% to .15%. |
| Manganese | .80% to 1.10%. |
| Silicon | .35% to .50%. |
| Sulfur | No more than .035%. |
| Phosphorus | No more than .03%. |
| Iron | Remainder. |

and having a roughened surface and having a thin but effective layer of an arc-widening material embedded in the valleys of said surface, the peaks of said surface being left uncovered so as to conduct electrical current readily, said material being embedded in said core from a slip having essentially the following composition:

| | Parts by water |
|---|---|
| Titanium dioxide (pigment grade) | 800 |
| Aluminum powder | 40 |
| Potassium permanganate | 200 |
| Magnesium carbonate | 100 |
| Aluminum phosphate | 100 |
| Sodium carbonate | 100 |
| Sodium silicate | 40 |
| Water | 1950 |

8. An arc-widening coating material for an arc-welding electrode consisting of a slip having the following composition:

| | Parts by weight |
|---|---|
| Titanium dioxide (pigment grade) | 800 |
| Aluminum powder | 40 |
| Potassium permanganate | 200 |
| Magnesium carbonate | 100 |

| | Parts by weight |
|---|---|
| Aluminum phosphate | 100 |
| Sodium carbonate | 100 |
| Sodium silicate | 40 |
| Water | 1950 |

9. In the method of arc-welding with a consumable electrode in a shield of carbon dioxide, the novelty of widening the arc by injecting into the arc arc-widening material deposited as a thin but effective coating on a previously roughened core coil said coating being derived from a powder or a slip or the like being effective to widen the arc.

References Cited in the file of this patent

UNITED STATES PATENTS

| | | |
|---|---|---|
| 2,694,764 | Muller | Nov. 16, 1954 |
| 2,805,317 | Brillie | Sept. 3, 1957 |
| 2,818,496 | Ludwig | Dec. 31, 1957 |
| 2,943,180 | Kelker | June 28, 1960 |